(12) United States Patent
Komatsu (10) Patent No.: US 7,177,873 B2
(45) Date of Patent: Feb. 13, 2007

(54) CONTENT DELIVERY SYSTEM, CONTENT DELIVERY METHOD, AND CONTENT REPRODUCING DEVICE

(75) Inventor: Shigeki Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 428 days.

(21) Appl. No.: 10/096,683

(22) Filed: Mar. 14, 2002

(65) Prior Publication Data

US 2002/0143807 A1  Oct. 3, 2002

(30) Foreign Application Priority Data

Mar. 16, 2001 (JP) ............................. 2001/076071

(51) Int. Cl.
*G06F 17/00* (2006.01)
*G06F 7/00* (2006.01)

(52) U.S. Cl. ............................. 707/100; 707/3; 705/50

(58) Field of Classification Search ................. 705/50, 705/51; 455/412.1; 380/231, 232; 707/3, 707/104.1, 1, 100
See application file for complete search history.

(56) References Cited

U.S. PATENT DOCUMENTS

| 6,424,828 | B1 * | 7/2002 | Collins et al. ............. 455/412.1 |
| 6,714,650 | B1 * | 3/2004 | Maillard et al. ............. 380/231 |
| 2002/0025777 | A1 | 2/2002 | Kawamata et al. |
| 2004/0064416 | A1 * | 4/2004 | Peled et al. .................... 705/51 |

OTHER PUBLICATIONS

European Search Report dated Mar. 11, 2004.
Carsten Griwodz, et al., "Protecting VoD the Easier Way", Proceedings of the ACM Multimedia 98, Sep. 12, 1998, pp. 21-28, XP000977484.

* cited by examiner

*Primary Examiner*—Sam Rimell
(74) *Attorney, Agent, or Firm*—McGinn IP Law Group, PLLC (57) ABSTRACT

A content delivery system, a method thereof, and a content reproducing device are provided. The content reproducing device comprises a content separator, an insufficient content storing section, and a server. The content separator separates or divides content into an insufficient content and a complementary content. The insufficient content storing section stores the insufficient content sent (outputted) from the content separator. The server includes a storing means for storing the complementary content sent from the content separator, and sends the complementary content to the content reproducing device via a network. The content reproducing device acquires the complementary content from the server and the insufficient content from the insufficient content storing section. Thereafter, the content reproducing device reproduces the content using the insufficient content and the complementary content. Thereby, it is possible to provide a system and a method which save the trouble of checkin and/or checkout operation and thus enhance user's usability. Further, according to the system and the method, a content provider can charge a user for content each time a user reproduces content.

24 Claims, 4 Drawing Sheets

CONTENT DELIVERY SYSTEM, CONTENT DELIVERY METHOD, AND CONTENT REPRODUCING DEVICE

BACKGROUND OF THE INVENTION

The present invention relates to a content delivery system and a method thereof for delivering content such as music (including sound and voice) information, image information, and moving picture information, and a content reproducing device such as an information terminal for reproducing the content.

DESCRIPTION OF THE RELATED ART

There has been developed an information terminal equipped with a Web browser so as to acquire content data from a server of a Web site, receive a message therefrom, and send and receive e-mail. The acquired data, message and e-mail are displayed on a displaying section of the information terminal.

Concerned with content received at the information terminal, there has been a problem of illegal copy and illegal transmission to a third party. To prevent such illegal act, some kind of countermeasure is required.

Heretofore, to protect a copyright for content, the content is encrypted, and at the time of reproduction, the encrypted content is restored to its original form by using a cipher key.

Besides, in the case of permitting a person to copy content only predetermined number of times, for example, the following are needed:

a database for confirming whether or not the copies are legal and for managing a count of content's copies;

checkin and/or checkout operation for updating the database (operation for increasing and decreasing the count of content's copies);

a system of encryption to prevent illegal interpolation of management information in the database, etc; and a system to prohibit reproduction of an illegally copied content.

Incidentally, content is sent to users by downloading the content via a mobile phone, distributing it using CD (compact disc) as a supplement to a magazine, and the like.

In the conventional system, there are some problems as follows.

As a first problem, as described above, it is required to have a database to manage the count of copies of original content, and thereby, it is necessary to additionally prepare a device such as a PC (personal computer) to manage the database.

Therefore, when content is reproduced by a mobile phone, etc., a user needs a PC in addition to the mobile phone. This will be burden to a user who owns only the mobile phone because the user has to newly have a PC.

Furthermore, to update the database, it is necessary for a user to execute checkin and/or checkout operation every time he copies the content.

As a second problem, even if a PC for database management is prepared, as the amount of contents acquired by a user increases, the used space in the database also increases, and finally, the content exceeds the storage capacity of the database. In the case of using a general database, it is possible to take a measure such as backing up the database into another medium. However in the case of using the database in question, it is impossible to back up the database in order to prevent unauthorized use and interpolation of the contents.

As a third problem, in the case of downloading content via a mobile phone, the transmission speed is slow and thus it takes long time to download the content. Even if the transmission speed is fast, there are still some problems that communication expense gets high, and the like, because of high-volume data transmission.

As a fourth problem, even when a content provider hopes to charge on pay-per-view basis, there is no means to realize the system.

SUMMARY OF THE INVENTION

It is therefore an object of the present invention to solve these problems and to provide a user with usability such that checkin and/or checkout operation becomes unnecessary, and provide a content provider with a system and a method for charging a user for content each time a user reproduces content.

According to the present invention, for achieving the objects mentioned above, there is provided a content delivery system for delivering content to a content reproducing device that reproduces content, comprising: a content separator that separates or divides content into a first content (an insufficient content) and a second content (a complementary content); a first content storing means that stores the first content outputted from the content separator; and a server that includes a storing means for storing the second content outputted from the content separator, and that transmits the second content to the content reproducing device via a network; wherein the content reproducing device acquires the second content from the server and the first content from the first content storing means, and reproduces the content using the first content and the second content.

The present invention is characterized in that the first content storing means stores content related information (content ID) concerned with the second content, and the first content, and that the content reproducing device acquires the content related information and the first content from the first content storing means.

In this case, it is preferable that the content reproducing device transmits the content related information to the server, and that the server transmits the second content to the content reproducing device on the basis of the content related information.

Further, according to the present invention, there is provided a content delivery method for delivering content to a content reproducing device capable of reproducing content, comprising the steps of separating or dividing content into a first content and a second content; storing the separated or divided second content in a server connected to a network; and providing the first content to the content reproducing device, and transmitting the second content from the server to the content reproducing device via a network.

In the content delivery system and the content delivery method according to the present invention, the server can easily makes a charge for the content when transmitting the second content to the content reproducing device. Thereby, it becomes possible to charge a user while reproducing content.

Further, according to the present invention, there is provided a content reproducing device for receiving a complementary content at the time of reproducing content on the basis of content related information, restoring a complete content using the complementary content and an insufficient content, and reproducing the restored content.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the drawings, embodiments of the present invention will be explained in detail.

[First Embodiment]

Figure 1:
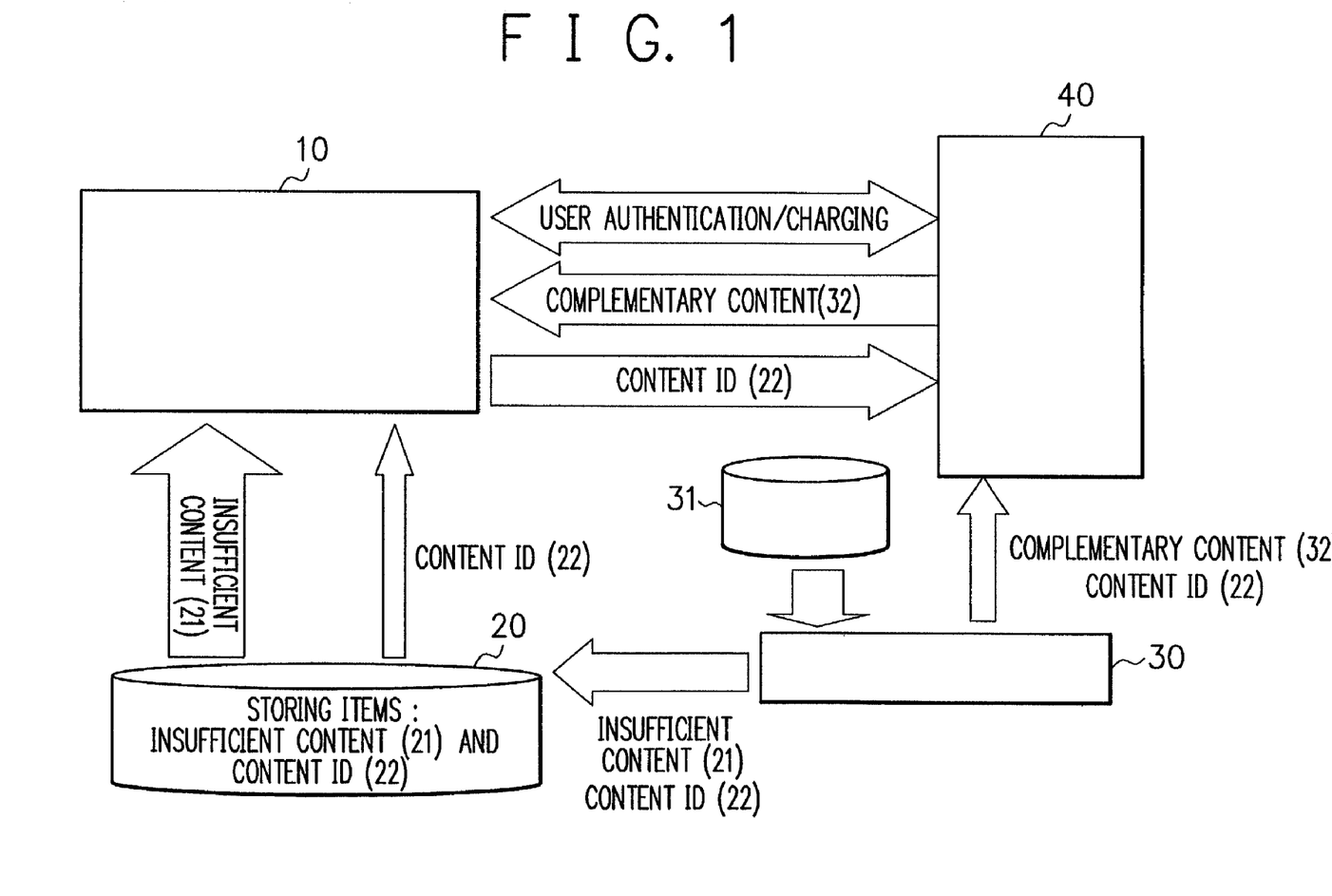
FIG. 1 is a block diagram showing a configuration of a content delivery system according to a first embodiment of the present invention.

FIG. 1 is a block diagram showing a configuration of a content delivery system according to a first embodiment of the present invention.

In FIG. 1, the content delivery system according to the first embodiment comprises a content reproducing device 10, an insufficient content storing section 20, a content separator 30, and a complementary content server 40. The content reproducing device 10 is a mobile communication terminal device such as a mobile phone terminal or a portable wireless information terminal owned by a user. The insufficient content storing section 20 stores an insufficient content 21. The insufficient content 21 lacks partial information (a complementary content) of the content 31. The content separator 30 separates (divides) a content 31 into the insufficient content 21 and a complementary content 32. The complementary content 32 is the partial information of the content 31, which is essential to reproduce the content 31 completely. The complementary content server 40 such as a computer stores the complementary content 32 and sends it to the content reproducing device 10.

The content separator 30 inputs therein the content 31 that is to be delivered to a user. Having separated the content 31, the device 30 outputs the insufficient content 21, the complementary content 32, and a content ID 22 for designating the content 31.

Content information stored in the insufficient content storing section 20 includes the insufficient content 21 and the content ID 22. It preferable that a content delivery service provider provides the insufficient content storing section 20 to users for convenient use.

The complementary content server 40 authenticates the content reproducing device 10 (a user), and establishes a connection to the device 10. After having established the connection, the server 40 receives the content ID 22 from the device 10 and sends the complementary content 32 designated by the content ID 22 to the device 10.

Moreover, the complementary content server 40 charges for the content 31 while sending the complementary content 32.

Incidentally, it is preferable to dispose the complementary content server 40 and the content separator 30 on the side of the content delivery service provider for convenient use.

After the content reproducing device 10 is authenticated by the complementary content server 40 and the connection to the server 40 is established, the device 10 retrieves the content ID 22 from the insufficient content storing section 20, and sends it to the complementary content server 40. Thereafter, the device 10 receives the complementary content 32 from the server 40.

Further, having taken out the content ID 22 from the insufficient content storing section 20, the content reproducing device 10 also takes out the insufficient content 21 from the storing section 20, and restores the content 31 without any lack by combining the complementary content 32 and the insufficient content 21 to reproduce the complete content 31.

By this means, in the content delivery system shown in FIG. 1, at the time of reproduction, the content reproducing device 10 receives the complementary content 32 on the basis of the content ID 22, and restores the content 31 to its original state using the insufficient content 21 and the complementary content 32. While the complementary content 32 is being transmitted, accounting for the content 31 is executed to a user. By this configuration, it becomes possible to charge a user each time he reproduces content. Further, by preparing insufficient content in advance on the user's side, it is possible to download content effectively. Incidentally, the insufficient content 21 is provided free of charge. Besides, the insufficient content 21 is preferably configured, when the content separator 30 separates the content 31, so that a user can look at or listen to a part of the insufficient content 21 free of charge. Alternatively, the insufficient content 21 may as well be configured so that a user cannot look at or listen to it.

Configuration for Content Separation

Next, in reference to FIG. 2, an explanation will be given of a configuration for content separation in the content delivery system shown in FIG. 1.

While in the following explanation content is described as music data (including sound, voice, etc.) and moving picture data, the content of the present invention will not limited to the above-described information (data).

The content separator 30 inputs therein the content 31, separates the content 31 into the complementary content 32 and the insufficient content 21, and generates the content ID 22 for designating the content 31. Thereafter, the separator 30 outputs the insufficient content 21 with the content ID 22 to the insufficient content storing section 20, and the complementary content 32 with the content ID 22 identical to that outputted to the storing section 20 to the complementary content server 40.

A complementary content database 44 included in the complementary content server 40 records the content ID 22 and the complementary content 32.

The insufficient content information includes the insufficient content 21 and the content ID 22 designating the content 31, and is stored in the insufficient content storing section 20. In the insufficient content 21, data necessary to completely reproduce the content 31 is excluded.

On the other hand, the complementary content information includes the complementary content 32 and the content ID 22 designating the content 31, and is stored in the complementary content database 44. The complementary content 32 is the data necessary to completely restore the content 31 by combining with the insufficient content 21.

The complementary content 32 includes the remaining content information except for the insufficient content 21 of the content 31.

The insufficient content storing section 20 is a medium to store and transfer the insufficient content 21 and the content ID 22. The medium may be a permanent storage medium or a temporary storage medium. For example, the medium may be a CD-ROM (compact disc read only memory) or a download file of a Web site. In the case of using a download file, the insufficient content 21 and the content ID 22 are downloaded by accessing an insufficient content storing section of a Web site from the content reproducing device 10.

Moreover, the insufficient content storing section 20 may be a (portable) card-type IC memory (integrated circuit memory) and memory chip both of which can be connected to the content reproducing device 10.

Configuration for Delivery of Content and Reproduction thereof

Next, in reference to FIG. 3, an explanation will be given of a configuration for content delivery and the reproduction thereof in the content delivery system shown in FIG. 1.

The complementary content server 40 includes a user authentication and charging section 41, a user authentication and charging database 42, a content transmitter and receiver 43, and the complementary content database 44.

The user authentication and charging section 41 authenticates a user (the content reproducing device 10) on the basis of user information in the user authentication and charging database 42. Only when the user is authenticated, the section 41 establishes a connection to the content reproducing device 10. Moreover, the section 41 updates the database 42 because the section 41 charges a fee(s) while the connection is established between the section 41 and the device 10.

The content transmitter and receiver 43 receives the content ID 22 from the content reproducing device 10, and takes out (retrieves) the complementary content 32 designated by the content ID 22 from the complementary content database 44, and sends it to the device 10.

The content reproducing device 10 includes a wireless section 11, a content restoring section 12, a content reproducing section 13, and a control section 14.

The wireless section 11 executes wireless communication via a wireless communication line (not shown) to access the complementary content server 40. After the user is authenticated by the user authentication and charging section 41 in the complementary content server 40 and a connection to the server 40 is established, the wireless section 11 transmits the content ID 22 and receives the complementary content 32. Hereat, the wireless communication line may be a mobile communication line, wireless LAN (local area network), and the like. In addition, another kind of wireless communication line may be applied.

The content restoring section 12 restores the complete content 31 on the basis of the complementary content 32 from the complementary content server 40 and the insufficient content 21 from the insufficient content storing section 20.

The content reproducing section 13 reproduces the complete content 31 through a speaker and/or a (thin-film-type) displaying device such as a liquid crystal display (LCD), a plasma display panel (PDP), an electro luminescent (EL) display, or the like. For example, assuming the content 31 is music information, the music is reproduced through a speaker by audio processing. Besides, assuming the content 31 is image information, the image is displayed on a display.

The control section 14 controls wireless communication, user authentication, content restoration, content reproduction, and the like. In the case for acquiring an insufficient content from Web, a program for using Web may be also stored in the control section 14.

Explanation of Operation

Next, an explanation will be given of operation of the content delivery system shown in FIG. 1.

Figure 2:
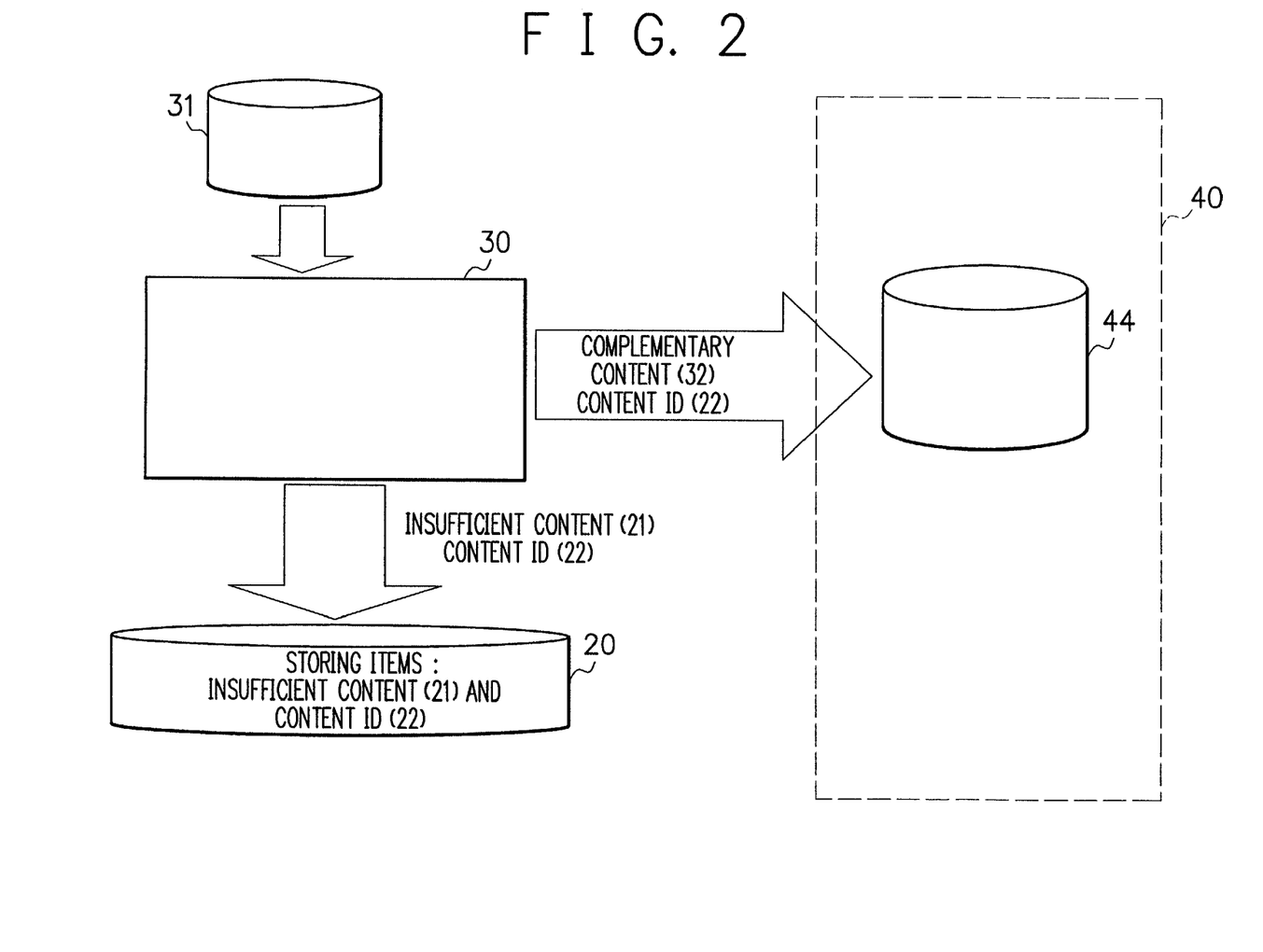
FIG. 2 is a block diagram showing a configuration for content separation in the content delivery system shown in FIG. 1.

In FIG. 2, the content separator 30 separates the content 31 into the insufficient content 21 and the complementary content 32.

As a method of the separation, for example, the content 31 may be arranged as time series data. Subsequently, 12.5% (⅛) of the data may be assigned to the complementary content 32, and 87.5% (⅞) thereof may be assigned to the insufficient content 21.

For example, in the case of dealing with music data of 128 Kbps (kilobits per second), data of 1.28 Kbits per 0.01 second is necessary for the reproduction.

In this case, the first 160 bits, which is ⅛ of the bit strings of 1.28 Kbits, are assigned to the complementary content. On the other hand, the remaining 1120 bits, which is ⅞ thereof, are assigned to the insufficient content. Then, the total music data is separated with respect to each 0.01 second unit.

Incidentally, the ratio of the information amount of the insufficient content 21 to that of the complementary content 32 is not limited to the above one. Furthermore, the ratio of the separation may be changed according to each content.

When separating the content, the content separator 30 generates a content ID unique to each content. In this case, the device generates the content ID 22 unique to the content 31. For example, an ID used by a content provider for the management of each content may be directly used as the content ID.

Incidentally, it is also possible to regard a plurality of contents as one content. For example, in the case of dealing with a film in two volumes, the two volumes of the film are regarded as one content. Therefore, one content ID is assigned thereto, and the two volumes of the film are transmitted to the content reproducing device 10 as one content at a time.

The content separator 30 puts the generated content ID 22 and the insufficient content 21 together in the form corresponding to the means of delivery (distribution). For example, in the case of distributing the ID 22 and the content 21 by a CD, the ID 22 and the content 21 are stored in the CD.

Moreover, the content separator 30 outputs the complementary content 31 and the content ID 22 to the complementary content server 40.

Incidentally, in order to reproduce the content perfectly, the content ID, the complementary content, or the like may includes information as address to assign each part of the complementary content to each part of the insufficient content. Such information may be included in a newly installed database for that purpose, or in a program that may be included in the complementary content, which will be described later.

Next, an explanation will be given of the operation at the time of reproducing content according to the present invention.

Figure 3:
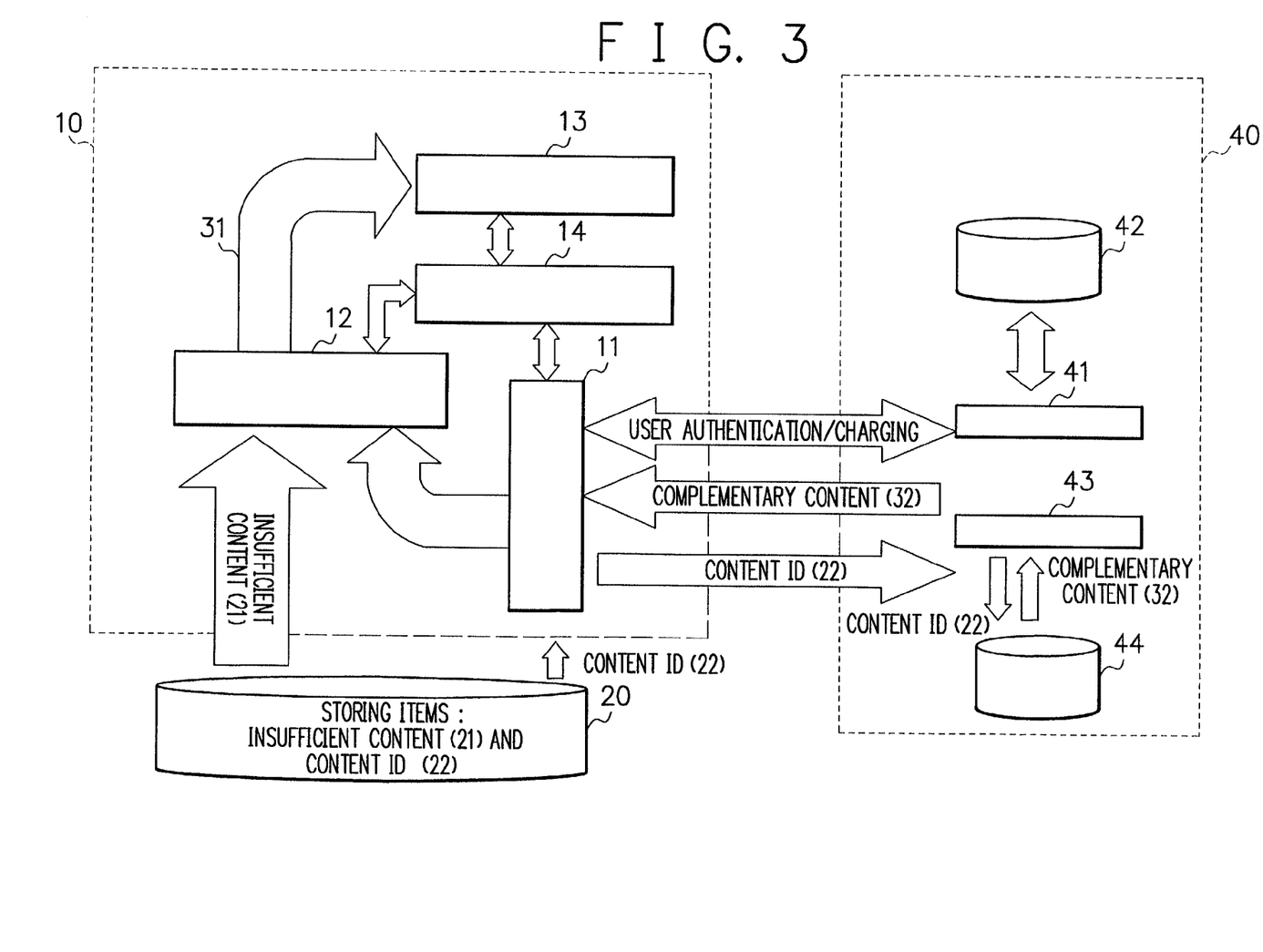
FIG. 3 is a block diagram showing a configuration for delivery of content and the reproduction thereof in the content delivery system shown in FIG. 1.

Referring to FIG. 3, before the server 40 sends the complementary content 32 to the content reproducing device 10, the wireless section 11 communicates by wireless via a wireless communication line (not shown) according to instructions from the control section 14, and further accesses the complementary content server 40 via a network. Furthermore, the wireless section 11 and the control section 14 send authentication data for user authentication to the complementary content server 40.

The user authentication and charging section 41 in the complementary content server 40 authenticates a user on the basis of the authentication data. Consequently, when the user is authenticated, the section 41 sends information that the authentication succeeded to the content reproducing device 10. Subsequently, the section 41 establishes a connection to the content reproducing device 10. Having established the connection, the section 41 executes charging operation to the user while transmitting the complementary content 32.

After the control section 14 received the information that the authentication succeeded, and after the connection between the content reproducing device 10 and the user authentication and charging section 41 was established, the control section 14 reads out the content ID 22 from the insufficient content storing section 20 in which the insufficient content 21 of the content 31 desired to be reproduced is stored. Subsequently, the control section 14 sends the content ID 22 to the complementary content server 40 via the wireless section 11.

The complementary content server 40 receives the content ID 22 at the content transmitter and receiver 43. Then, the server 40 searches the complementary content database 44 for the complementary content 32 corresponding to the received content ID 22. Subsequently, the server 40 sends the complementary content 32 from the content transmitter and receiver 43 to the wireless section 11.

Moreover, while transmitting the complementary content 32, the complementary content server 40 charges the user for the fees depending on the substance of the content. The cost of the content 31 may be included in the communication cost. This charging operation (the charging operation concerned with the transmission of the complementary content 32) finishes when the transmission of the complementary content 32 finishes, and goes back to the state where only the connection fees are charged. Incidentally, the connection is finished when instructions for exit is issued from the content reproducing device 10, and the charging operation for the connection fees is also finished.

Having received the complementary content 32, the wireless section 11 sends the complementary content 32 to the content restoring section 12 under the control of the control section 14.

In parallel with the transmission of the complementary content 32 to the content restoring section 12, the insufficient content 21 read out from the insufficient content storing section 20 on the basis of instructions from the control section 14. Subsequently, the insufficient content 21 is sent to the content restoring section 12.

Incidentally, in the case of downloading the insufficient content 21 and the content ID 22 from a Web, it is preferable to download the insufficient content 21 and the content ID 22 before receiving the complementary content 32.

Thereafter, the content restoring section 12 completely restores the content 31 using the complementary content 32 and the insufficient content 21.

The complete content 31 can be restored by a reverse way of the separating procedure executed by the content separator 30. If the above-described separating method is adopted, the content 31 is restored by executing the following operation.

For example, 160 bits of the complementary content are transmitted per 0.01 second, and thereby, the remaining 1120 bits are extracted from the insufficient content. Thereafter, the 160 bits of the complementary content are assigned to the first bit strings, and the 1120 bits of the insufficient content are assigned to the remaining bit strings every 0.01 second. Thereby, the complete content 31 is restored.

It is preferable to include the program for the restoration in the complementary content 32 received from the complementary content server 40. Further, the program is preferably started up automatically when the content restoring section 12 restores the content.

The content 31 thus restored completely is sent to the content reproducing section 13 to be reproduced.

After the reproduction of the content is finished, the wireless section 11 disconnects the complementary content server 40.

As explained hereinbefore, the first embodiment of the present invention brings about the following effects.

Firstly, the complementary content received at the time of reproduction (charging) can be reduced to small amount and can be sent at a relatively low bit rate. Thereby, it is possible to apply the present invention to a device having a wireless section that cannot receive content only at a low bit rate. On the other hand, when the wireless section is capable of receiving content at a high-speed bit rate, the amount of information of the complementary content may as well be increased.

Secondly, the distributed content (insufficient content) is the one in which parts of the complete content are lacking. Thereby, compared to an encrypted content, the distributed content has no risk to be cryptanalyzed. Therefore, the security becomes higher.

Thirdly, the charging function of a mobile phone can be directly applied to the present invention without preparing a special charging function. Thereby, it is possible to simplify the system.

Fourthly, while the conventional content security needs a database for content security and updating (checkin and/or checkout) operation for the database, the present system does not need them. Thereby, the convenience for the user becomes higher.

[Second Embodiment]

Figure 4:
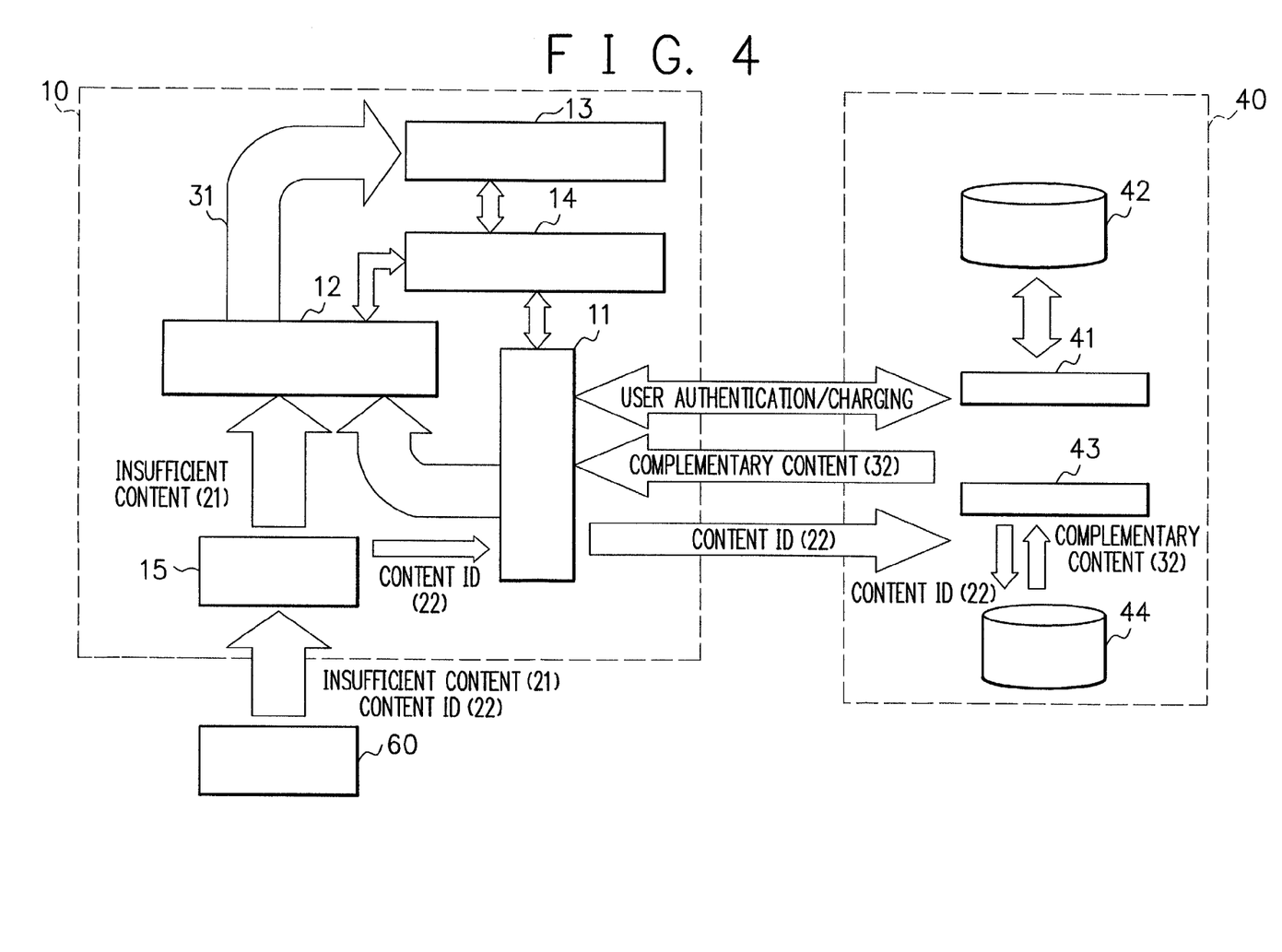
FIG. 4 is a block diagram showing a configuration of a content delivery system according to a second embodiment of the present invention.

FIG. 4 is a block diagram showing a second embodiment of the present invention.

The configuration of this embodiment is the same as the first embodiment except for a broadcasting station 60 and a broadcasting receiver 15. The broadcasting station 60 broadcasts insufficient content with the corresponding ID free of charge. The broadcasting receiver 15 included in the content reproducing device 10, and serves as the insufficient content storing section 20 in the first embodiment. Namely, the receiver 15 stores the insufficient content with the corresponding content ID.

Although not shown in FIG. 4, the content separator 30 is also disposed in this embodiment. As with the first embodiment, the content separator 30 separates a content 31 into a complementary content 32 and an insufficient content 21, and generates an content ID 22 unique to the content 31. Subsequently, the separator 30 sends the complementary content 32 with the content ID 22 to the complementary content server 40 and the insufficient content 21 with the content ID 22 to the broadcasting station 60.

Incidentally, there is prepared a sort of a content guide wherein content to be broadcasted is described. Such a content guide is preferably given to a user in advance so that the user can select content to be reproduced.

Assuming that the above-described operation has executed, an explanation will be given of this embodiment.

First, the content reproducing device 10 (a user) selects content to be reproduced referring the content guide (hereinafter, the content is referred to the content 31).

Subsequently, the device 10 receives the selected insufficient content 21 with the corresponding content ID 22 from the broadcasting station 60. The transmitted content 21 and the ID 22 are stored in the broadcasting receiver 15 in the content reproducing device 10.

When the content reproducing device 10 reproduces the content 31 completely (when the user wants to see the content 31), the same operation as the first embodiment is executed. Incidentally, as with the first embodiment, the complementary content 32 is transmitted only when the content reproducing device 10 is authenticated.

In this embodiment, the same effects as the first embodiment can be obtained. Further, because broadcasting is used as an insufficient content transmitting means, it is possible to provide a pay-per-view system in the broadcasting.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A content delivery system for delivering content, said system comprising:
   a content source;
   a server;
   a content storing device, separate from the server;
   a content separator that separates content from the content source into a first content portion and a second content portion, provides the first content portion to the content storing device for storage therein, and provides the second content portion to the server for storage therein; and
   a content reproducing device for acquiring the second content portion from the server via a network, acquiring the first content portion from the content storing device via another route wholly separate from the server and the network, and combining the first content portion and the second content portion to reproduce the content.

2. A content delivery system for delivering content, said system comprising:
   a content source;
   a server;
   a content storing device, separate from the server;
   a content separator that separates content from the content source into a first content portion and a second content portion, provides the first content portion to the content storing device for storage therein, and provides the second content portion to the server for storage therein; and
   a content reproducing device for acquiring the second content portion from the server via a network, acquiring the first content portion from the content storing device via another route wholly separate from the server and the network, and combining the first content portion and the second content portion to reproduce the content,
   wherein the server makes a charge for the content at the time of transmitting the second content portion to the content reproducing device.

3. The content delivery system as claimed in claim 1, wherein:
   the content separator provides the server and the content storing device with content related information identifying the content, for storage with the first content portion and the second content portion; and
   the content reproducing device acquires the content related information from the content storing device, together with the first content portion.

4. The content delivery system as claimed in claim 2, wherein:
   the content separator provides the server and the content storing device with content related information identifying the content, for storage with the first content portion and the second content portion; and
   the content reproducing device acquires the content related information from the content storing device, together with the first content portion.

5. The content delivery system as claimed in claim 1, wherein:
   the content separator provides the server and the content storing device with content related information identifying the content, for storage with the first content portion and the second content portion;
   the content reproducing device acquires the content related information from the content storing device, together with the first content portion; and
   the server transmits the second content portion to the content reproducing device on the basis of the content related information.

6. The content delivery system as claimed in claim 2, wherein:
   the content separator provides the server and the content storing device with content related information identifying the content, for storage with the first content portion and the second content portion;
   the content reproducing device acquires the content related information from the content storing device, together with the first content portion; and
   the server transmits the second content portion to the content reproducing device on the basis of the content related information.

7. The content delivery system as claimed in claim 1, wherein:
   the content separator provides the server and the content storing device with content related information identifying the content, for storage with the first content portion and the second content portion;
   the content reproducing device acquires the content related information from the content storing device, together with the first content portion; and
   the server authenticates the content reproducing device before transmitting the second content portion to the content reproducing device, and transmits the second content portion to the content reproducing device only when the content reproducing device is authenticated.

8. The content delivery system as claimed in claim 2, wherein:
   the content separator provides the server and the content storing device with content related information identifying the content, for storage with the first content portion and the second content portion;

the content reproducing device acquires the content related information from the content storing device, together with the first content portion; and the server authenticates the content reproducing device before transmitting the second content portion to the content reproducing device, and transmits the second content portion to the content reproducing device only when the content reproducing device is authenticated.

9. The content delivery system as claimed in claim 1, wherein:

the content separator provides the server and the content storing device with content related information identifying the content, for storage with the first content portion and the second content portion;

the content reproducing device acquires the content related information from the content storing device, together with the first content portion;

the server transmits the second content portion to the content reproducing device on the basis of the content related information;

the server authenticates the content reproducing device before transmitting the second content portion to the content reproducing device, and transmits the second content portion to the content reproducing device only when the content reproducing device is authenticated.

10. The content delivery system as claimed in claim 2, wherein:

the content separator provides the server and the content storing device with content related information identifying the content, for storage with the first content portion and the second content portion;

the content reproducing device acquires the content related information from the content storing device, together with the first content portion;

the server transmits the second content portion to the content reproducing device on the basis of the content related information;

the server authenticates the content reproducing device before transmitting the second content portion to the content reproducing device, and transmits the second content portion to the content reproducing device only when the content reproducing device is authenticated.

11. The content delivery system as claimed in claim 1, wherein the content comprises pay per view content.

12. The content delivery system as claimed in claim 2, wherein the content comprises pay per view content.

13. A content delivery method, comprising:

separating content into a first content portion and a second content portion;

storing the second content portion in a server connected to a network;

storing the first content portion in a content storing device, separate from the server; and transmitting the second content portion from the server to a content reproducing device via a network, and providing the first content portion from the content storing device to the content reproducing device via another route wholly separate from the server and the network, the content reproducing device combining the first content and the second content so as to produce output to a user.

14. A content delivery method, comprising:

separating content into a first content portion and a second content portion;

storing the second content portion in a server connected to a network;

storing the first content portion in a content storing device, separate from the server; and transmitting the second content portion from the server to a content reproducing device via a network, and providing the first content from the content storing device to the content reproducing device via another route wholly separate from the server and the network, the content reproducing device combining the first and second content so as to produce output to a user, wherein:

the server makes a charge for the content at the time of transmitting the second content portion to the content reproducing device.

15. The content delivery method as claimed in claim 13, wherein the server transmits the second content portion to the content reproducing device on the basis of content related information identifying the content.

16. The content delivery method as claimed in claim 14, wherein the server transmits the second content portion to the content reproducing device on the basis of content related information identifying the content.

17. The content delivery method as claimed in claim 13, wherein:

the server transmits the second content portion to the content reproducing device on the basis of content related information identifying the content; and the server authenticates the content reproducing device before transmitting the second content portion to the content reproducing device, and transmits the second content portion to the content reproducing device only when the content reproducing device is authenticated.

18. The content delivery method as claimed in claim 14, wherein:

the server transmits the second content portion to the content reproducing device on the basis of content related information identifying the content; and the server authenticates the content reproducing device before transmitting the second content portion to the content reproducing device, and transmits the second content portion to the content reproducing device only when the content reproducing device is authenticated.

19. The content delivery method as claimed in claim 13, wherein the content comprises pay per view content.

20. The content delivery method as claimed in claim 14, wherein the content comprises pay per view content.

21. The content delivery method as claimed in claim 13, further comprising combining the first content portion and the second content portion to provide the content.

22. The content delivery method as claimed in claim 21, further comprising reproducing the content.

23. The content delivery method as claimed in claim 14, further comprising combining the first content portion and the second content portion to provide the content.

24. The content delivery method as claimed in claim 23, further comprising reproducing the content.

* * * * *